Patented May 27, 1941

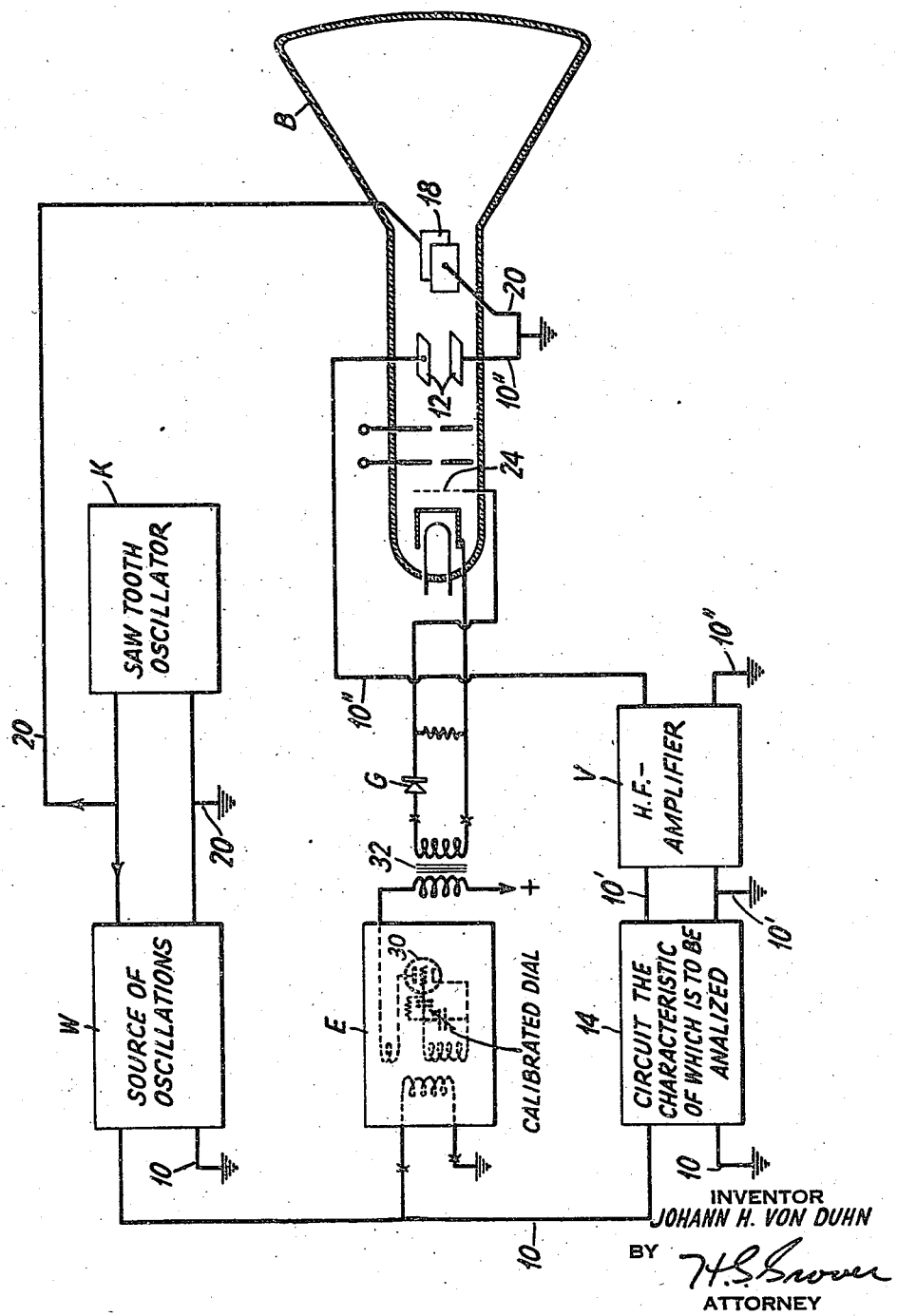

2,243,234

UNITED STATES PATENT OFFICE 2,243,234

WAVE INDICATION

Johann Hermann von Duhn, Potsdam-Babelsberg, Germany, assignor to Telefunken Gesellschaft für Drahtlose Telegraphie m. b. H., Berlin, Germany, a corporation of Germany Application January 18, 1940, Serial No. 314,532
In Germany November 24, 1938

4 Claims. (Cl. 175—183)

This invention concerns means for and a method of measuring a standing frequency curve of a filter registered in a cathode ray oscillograph by means of a periodically varying frequency.

The invention relates to a method of measuring a frequency curve, for instance, in order to determine the band width of a resonance curve of a filter which is registered in a cathode ray oscillograph in a known manner by means of a wobble transmitter.

In describing my invention, reference will be made to the attached drawing wherein the single figure illustrates a wave analyzing circuit arranged in accordance with my invention.

A wobble transmitter W consists as is known of an oscillator whose frequency is periodically varied, for instance, by means of a reactance tube modulator connected as inductance of the oscillator circuit whereby the variation occurs in the rhythm of a varying grid biasing potential applied to the reactance tube. When applying to the grid of the reactance tube wobbling the oscillations generated, a relaxation potential obtained from a relaxation oscillator K, the frequency variation or wobble takes place in proportion to time. Now, if energy from the output of the wobble transmitter W is supplied through line 10, 10', and 10" to the vertical deviation plates 12 of a cathode ray oscillograph B by way of the oscillatory circuit 14 to be examined and by way of a high frequency amplifier V, while voltages from the relaxation generator K are applied to the horizontal deviation plates 18 by line 20, there appears on the fluorescent screen the resonance curve of the circuit in unit 14 to be investigated. Since the variation of the self-induction caused by the wobble tube is rather slight, the actual wobble transmitter will be operated on a rather high frequency which will then be heterodyned with a second frequency produced by an additional oscillator and after detection the actual working frequency is obtained which is applied by lines 10 to the oscillatory circuit 14 or band filter to be examined. That is, an oscillator in W has its frequency wobbled in a well known manner by a reactance tube controlled by potentials from K. The wobbled oscillations are mixed with oscillations from a second source in W detected therein and detected components supplied to the circuit to be analyzed at 14.

In order to examine exactly the properties of a band filter, it is necessary that the curve registered in the oscillograph can be measured in some way, that is, its location in the frequency spectrum indicated. In other words, it should be possible to give the various bumps, etc., in kilocycles per second. It would be possible to provide the fluorescent disc (cathode ray tube target) with a mark (thread or the like) and to have the image wandering across the disc by varying the frequency of the said additional oscillator in order to measure in this manner the frequency distances. This method has two serious disadvantages. In the first place, in order to provide constancy of the frequency of the two oscillators such that the gauging will be accurate in all cases, a considerable number of means are required, especially since in view of the wobbling action the main oscillator cannot be stabilized by means of a quartz crystal, secondly, the curve moves in part out of the image field during operation so that the proper aspect will be lost.

In accordance with the invention, the varying frequency potentials aside from being applied to the filter 14 to be measured are also impressed upon an adjustable, gauged and very narrow filter in E, more particularly, upon a gauged receiver whose output potential is detected at G and applied to an electron stream intensity control electrode 24 of the oscillograph B for producing a mark which stands out in its luminous intensity from the frequency curve registered.

This mark can be shifted across the entire oscillogram while the appertaining frequency can be read on a scale. The arrangement is as follows: There is loosely coupled to the output of the wobble transmitter W, a receiver E consisting of an audion 30 with a low frequency output. Now, if the frequency to which the receiver is adjusted is such that the wobbled radio-frequency wave passes through a frequency spectrum including the frequency of the receiver E, a current impulse appears in the output of the receiver E. Through suitable construction of the receiver circuit (low damping, loose coupling to the audion tube 30), which represents the gauged filter, the current impulse can be given a very brief duration and can be rendered very sharp. The output of the receiver contains a transformer 32 having the task of withholding from the receiver the high plate potential of the cathode ray oscillograph, so that the two windings of said transformer are insulated against each other for 1000 to 2000 volts. The current impulse appearing at the output of the transformer will now be detected by a detector G and smoothed whereafter it is applied to the light control electrode 24 of the oscillograph. If necessary, the light or electron stream intensity control electrode 24 is given in the state of rest, that is when the circuits in E are not sharply resonant to the frequency of the wave fed thereto, a slight positive biasing potential which is derived from a battery insulated against ground. The detector G is given, for instance, such polarity that the current impulse acts as negative potential impulse upon the light control electrode as a result of which the positive biasing potential will be compensated and the cathode ray will be extinguished. That is, there will be a vertical line on the target due to reduction in electron stream intensity when the receiver E accepts wave energy from W and in turn supplies an impulse to the uni-lateral device G to pull down the potential on intensity control electrode 24. This mark will indicate the position of the wave energy frequency in the frequency spectrum of the wave passed by the circuit in 14. This permits fuller exploration of the characteristics of the circuit in 14 under examination.

Due to the sharp resonance of the circuits in E, there may be some appreciable time delay in the oscillograph grid pulse appearing after the oscillator frequencies passes the frequency accepted by E. If the wobble wave is of proper shape, the delay will show up first to the right and then to the left so the center of the double line will be the correct point.

What is claimed is:

1. The method of measuring a standing frequency curve of a filter registered in a cathode ray oscillograph by means of a periodically varying frequency, characterized in that the varying frequency is applied to the filter to be measured and is also impressed upon an adjustable, gauged, very narrow filter, more especially a gauged receiver whose output potential will be detected and applied to an electron stream intensity control electrode of the oscillograph for producing a visible mark which stands out in its luminous intensity from the registered frequency curve.

2. In a circuit characteristic analyzing system, a cathode ray tube having, a target electrode, a plurality of pairs of deflecting electrodes and a cathode ray intensity control electrode, a source of wave energy the frequency of which is wobbled over a frequency spectrum at least equal to the frequency spectrum of the circuit to be analyzed, means for impressing said wave energy on said circuit and from said circuit on a pair of said deflecting electrodes, means for applying an alternating potential of a frequency related to the frequency at which said wave energy is wobbled to another pair of said deflecting electrodes, rectifying means coupled to said control electrode, and a selective circuit coupling said source of wave energy to said rectifying means.

3. Means for analyzing the wave translation characteristics of a circuit comprising, a cathode ray tube having a target electrode, a ray intensity control electrode and means for deflecting the cathode ray, with wave energy of wobbled frequency fed to the deflecting means by way of said circuit and wave energy of a frequency related to said first wave energy fed to said deflecting means to produce on said target a curve representing the translation characteristics of said circuit, and means for producing on said target an indication of the frequency of the said first wave energy comprising a circuit sharply resonant at a frequency within the frequency range through which said first named wave energy is wobbled, means for impressing said wave energy on said sharply resonant circuit, and means conductive in one direction coupling the output of said last circuit to said intensity control electrode to change the intensity of the cathode ray falling on said target when the said wave of wobbled frequency passes through the frequency at which said highly selected circuit is resonant.

4. Means for analyzing the wave translation characteristics of a circuit comprising, a cathode ray tube having a target electrode, a ray intensity control electrode and pairs of deflecting means, with wave energy of wobbled frequency fed to one of the deflecting means by way of said circuit and wave energy of a frequency related to said wave energy of wobbled frequency fed to another of said deflecting means to produce on said target a curve representing the translation characteristics of said circuit, and means for producing on said target an indication of the frequency of the said wave energy of wobbled frequency comprising a circuit sharply resonant at a frequency within the frequency range through which said first named wave energy is wobbled, means for impressing said wave energy on said sharply resonant circuit, and a rectifying means coupling the output of said sharply resonant circuit to said intensity control electrode to change the intensity of the ray falling on said target when the said wave energy of wobbled frequency passes through the frequency at which said highly selected circuit is resonant

JOHANN HERMANN VON DUHN.